United States Patent [19]

Kuroda

[11] 4,088,169
[45] May 9, 1978

[54] REINFORCED BEAD PORTION FOR PNEUMATIC TIRES

[75] Inventor: Masahiro Kuroda, Higashi-Murayami, Japan

[73] Assignee: Bridgestone Tire Company Limited, Tokyo, Japan

[21] Appl. No.: 744,854

[22] Filed: Nov. 24, 1976

[30] Foreign Application Priority Data

Dec. 25, 1975  Japan ................. 50-155480

[51] Int. Cl.$^2$ ............................. B60C 15/04
[52] U.S. Cl. ..................... 152/362 R; 152/354 R
[58] Field of Search ............ 152/362 R, 362 CS, 354

[56] References Cited

U.S. PATENT DOCUMENTS

| | | | |
|---|---|---|---|
| 2,971,553 | 2/1961 | Woodall | 152/362 R |
| 3,921,693 | 11/1975 | Suzuki et al. | 152/362 R |
| 3,949,800 | 4/1976 | Lejeune | 152/362 R |

Primary Examiner—Randolph A. Reese

Attorney, Agent, or Firm—Sughrue, Rothwell, Mion, Zinn and Macpeak

[57] ABSTRACT

A reinforced bead portion for pneumatic tires used under heavy load and high flexural conditions, which can efficiently alleviate the stress subjected to a pair of bead cores each composed of at least two bead cores is disclosed. At least the inside bead core of the reinforced bead portion comprises a sector-shaped stress absorbing rubber layer included between two straight radial lines diverging from a center of the bead core, one of the these straight lines being inclined at an angle of 120° to 135° with respect to the other line. The stress absorbing rubber layer has a maximum thickness at its center which is 0.7 to 6, preferably 1 to 2.5 times the diameter of a metal cord of the bead core and a hardness which is at least equal to that hardness of a coating rubber of either one of a rubberized metal cord layer and a rubberized fabric for covering the rubberized metal cord layers which is lower than the hardness of the other.

3 Claims, 9 Drawing Figures

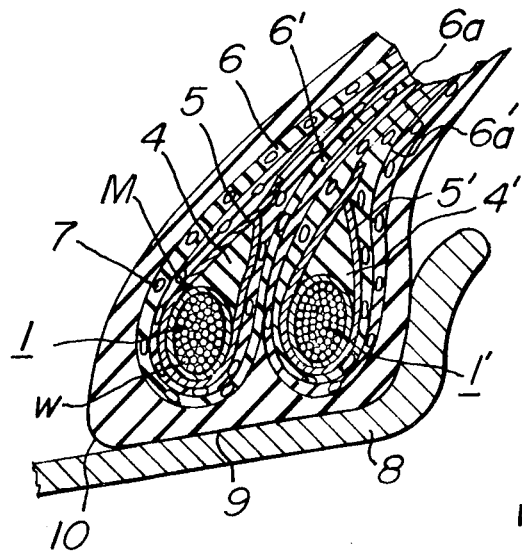
FIG_1a PRIOR ART
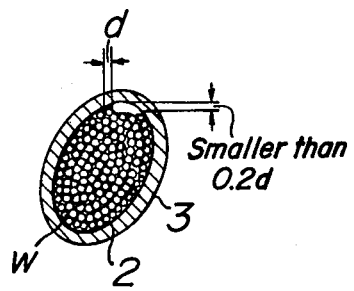
FIG_1b PRIOR ART
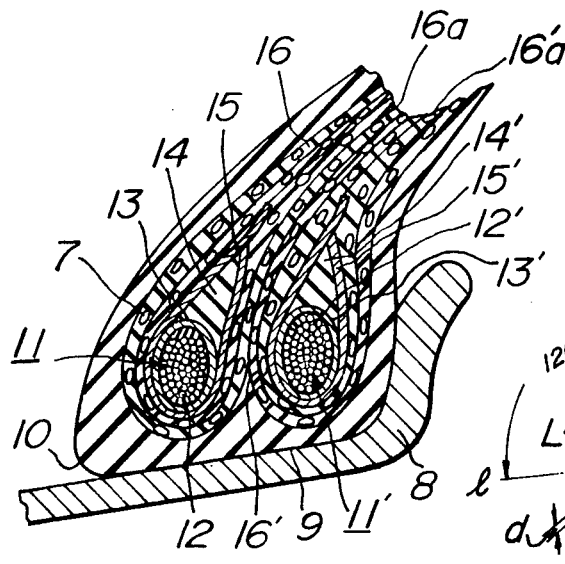
FIG_3a
FIG_3b

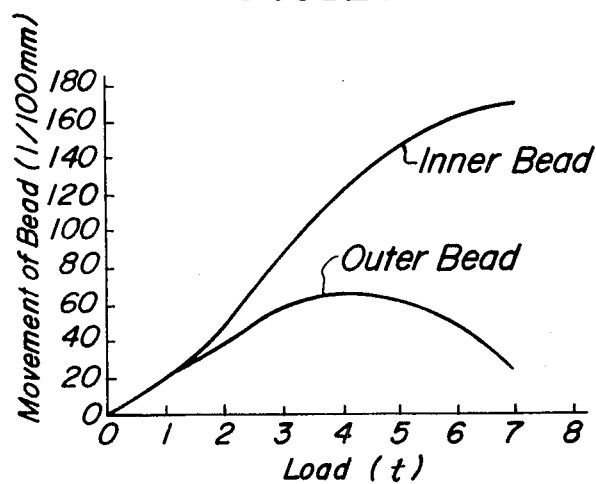
FIG._2a PRIOR ART
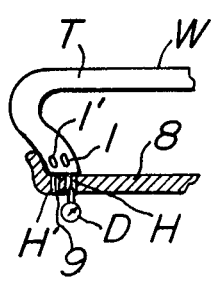
FIG._2b
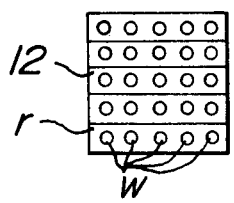
FIG._4 PRIOR ART
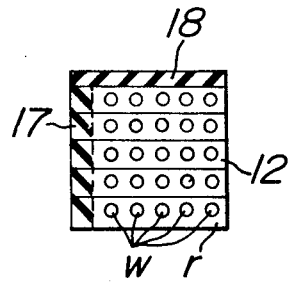
FIG._5a
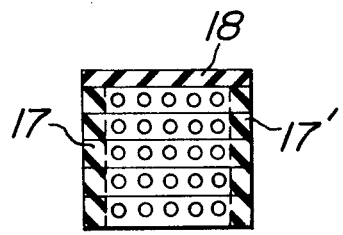
FIG._5b

REINFORCED BEAD PORTION FOR PNEUMATIC TIRES

FIELD OF THE INVENTION

This invention relates to pneumatic tires and more particularly to a reinforced beam portion for pneumatic tires.

BACKGROUND OF THE INVENTION

In the case of using a pneumatic tire under heavy load and highly flexural conditions of up to 25 to 40% of a sectional height of the tire, when the tire is pressurized or travels on roads, an interlayer strain is produced between a bead core and its surrounding member and becomes excessively large. Particularly, when the tire travels on roads, such excessively large interlayer strain together with accumulation of heat tends to induce a separation between a metal cord of the rubberized bead core and its coating rubber on the one hand and between a rubberized fabric covering the bead core and its coating rubber on the other hand. This separation induces a separation failure of the bond between a portion of the metal cord of the rubberized bead core and its coating rubber and the portion of the metal cord of the rubberized bead core becomes free from its coating rubber, thereby inducing a breakage of the tire.

The invention will now be described in greater detail with reference to the accompanying drawings.

BRIEF DESCRIPTION OF THE DRAWINGS

FIG. 1a is a cross-sectional view of a reinforced bead portion of a prior art pneumatic tire for airplanes;

FIG. 1b is a cross-sectional view of the bead core shown in FIG. 1a in an enlarged scale;

FIG. 2a is a graph illustrating movement of a bead portion as a function of load subjected to the tire shown in FIG. 1a;

FIG. 2b schematically illustrates experimental tests for obtaining the results shown in FIG. 2a;

FIG. 3a is a cross-sectional view of a reinforced bead portion of a pneumatic tire for airplanes according to the invention;

FIG. 3b is a cross-sectional view of the bead core shown in FIG. 3a in an enlarged scale;

FIG. 4 schematically illustrates a prior art bead grommet;

FIG. 5a schematically illustrates a bead grommet according to the invention; and FIG. 5b schematically illustrates a modified bead grommet according to the invention.

DESCRIPTION OF PREFERRED EMBODIMENTS

Referring to FIG. 1a, a reinforced bead portion of a prior art pneumatic tire for airplanes used under heavy load and highly flexural conditions comprises at least two bead cores 1, 1', each composed of a plurality of rubberized metal cords w wound one upon the other in radial relationship with respect to the bead cores 1, 1' so as to form a plurality of bundles 2. These bundles 2 are covered with a rubberized fabric 3 mostly formed of a rubberized wrapping tape. An apex rubber 4, 4' is superimposed about each the bead cores 1, 1' and the assembly is enclosed within a flipper 5, 5' to provide a reinforced bead portion.

Each the reinforced bead portions constructed as above described is inserted between rubberized carcass plies 6, 6' and turn-up portions 6a, 6a' thereof wound around the reinforced bead cores 1, 1', each the rubberized carcass plies 6, 6' being formed by a plurality of rubberized organic textile cord layers.

In FIG. 1a, reference numeral 7 designates a cord of the rubberized carcass ply, 8 a rim and 9 a base of the reinforced bead portion which is extended from a toe to a heel thereof.

All of the bundles 2 of each of the bead cores 1, 1' shown in FIG. 1a is substantially tightly covered with the rubberized fabric 3 so as to prevent the metal cords w from loosening and also to prevent the coating rubber of the rubberized metal cords w from being moved upon vulcanization, on the one hand, and to prevent the ends of the metal cords w wound into bundles from springing up, on the other hand, whereby the rubberized bead cores 1, 1' are prevented from being deformed.

The substantially tight covering of the rubberized fabric 3 about all the bundles 2 of prior art tire shall be understood to mean that a gap formed between the rubberized fabric 3 and the rubberized metal cords w is made smaller than about 20% of the diameter of the metal wire w.

Experimental tests have shown that a pneumatic tire comprising a plurality of reinforced rubberized bead cores used under heavy load and highly flexural conditions tends to frequently induce a separation failure around the rubberized beads cores 1, 1' due to a considerably large difference between modulus of elasticity or rigidity of members surrounding the rubberized bead cores 1, 1' and that of the rubberized bead cores 1, 1' per se.

That is, the rigidity of the rubberized bead cores 1, 1' is considerably higher than the rigidity of the coating rubber of the rubberized metal cords w and than the rigidity of the rubberized fabric 3 for covering the rubberized bead cores 1, 1', so that the tire is subjected to a large flexure when it is pressurized or travels on roads and stress is exerted on the bead portion. The stress exerted on the bead portion becomes maximum at the surface of the rubberized bead cores 1, 1'. The rubberized fabric 3 covering the rubberized bead core is mostly formed of an organic textile such as nylon and the like, so that the fabric 3 per se becomes elongated when it is subjected to stress. In this case, that region of the rubberized bead cores 1, 1' which are opposed and adjacent with each other and that region of the rubberized bead cores 1, 1' which constitutes the base 9 thereof facing the rim 8 are subjected to a strong binding force. As a result, movement produced at these regions is relatively small. Strain tends to be mainly concentrated into the upper half of the rubberized bead cores 1, 1'. In addition, experimental tests have demonstrated that movement of that portion of the rubberized carcass ply 6 which makes contact with the innermost bead core 1 becomes large, and that the interlayer strain produced around the rubberized bead core 1 becomes maximum at both side regions of a point M where the rubberized bead core 1 meets with the apex rubber 4 at that side of the rubberized bead core 1 which is faced toward the carcass ply 6.

In FIG. 2a are shown experimental test results obtained from movement of the base 9 of the bead portion occurring when the tire is deformed and a plot of movement of the inner bead 1 and the outer bead 1' as a function of the load subjected to the tire. As shown in FIG. 2b, in such experimental tests, the rim 8 is provided at those portions which are united with the bead portion with openings H, H' which face the inner bead core 1 and the outer bead core 1', respectively, and a vertical load W was applied to a tire T for airplanes. The movement of the base 9 of the bead portion relative to these openings H, H' as a function of the vertical load W was measured by means of a dial gauge D.

As can be seen from FIG. 2a, as the load W applied to the tire increases, the movement of the bead portion increases. Particularly, the movement of the inner bead 1 increases in proportion to the increase of the load W applied to the tire, while the movement of the outer bead 1' gradually increases up to about 4 tons of the load W applied to the tire, but decreases if the load W exceeds 4 tons. That is, at the beginning of the load W 1.5 tons subjected load applied to the tire T, the base 9 of the bead portion as a whole tends to separate from the rim 8. However, at about 1.5 to 4 tons of the load, the movement of the inner bead 1 becomes greater than the movement of the outer bead 1'. At the load larger than about 4 tons, the movement of the outer bead 1' decreases, that is, the outer bead 1' is compressed onto the rim 8. Finally, the load W is transmitted to the rim 8 by the outer bead 1' only. In other words, the inner bead 1 is always subjected to tension, while if a higher load is applied to the outer bead 1', the outer bead 1' becomes compressed.

It is believed, therefore, that the great movement of the inner bead 1 causes the above described interlayer strain.

Experimental tests have also shown that separation in the bundles of the bead core 1, 1' occurs only near the point M shown in FIG. 1a. Such separation in the bundles of the bead core 1, 1' often develops in to a tire failure called "wild wire" in pneumatic tires such as pneumatic tires for airplanes and the like.

The separation causes the rubberized metal cords w to be separated from its rubber bonding and that portion of the metal cords w which becomes loosely wound is repeatedly bent as the tire travels on roads until the wire becomes broken due to fatigue. This broken end of the wire tends to break the fabric 3 surrounding the bundles 2 of the rubberized metal cords w. In addition, the broken end of the wire extends through the rubber and becomes exposed to the inner wall of the tire, thus inducing the tire failure. Such tire failure renders it impossible to regenerate the tire for airplanes which has been deemed necessary in this field of the tire industry. This is an economically difficult problem which is encountered with prior art reinforced bead portion pneumatic tires.

In order to obviate such disadvantage, in accordance with the invention, as shown in FIG. 3a, provision is made of a reinforced bead portion which is substantially the same in construction as that shown in FIGS. 1a and 1b. That is, the reinforced bead portion comprises two bead cores 11, 11' each composed of a plurality of bundles 12, 12' each formed by winding a plurality of rubberized metal cords w one upon the other in radial relationship with respect to the bead core 11, 11' a rubberized fabric 13, 13' for covering the bundles 12, 12' as a whole, an apex rubber 14, 14' superimposed about the bead core 11, 11', a flipper 15, 15' for enclosing the bead core 11, 11' and the apex rubber 14, 14' therein, and a bias carcass ply 16, 16' formed of a plurality of rubberized organic textile cord layers and for wrapping up the flipper 15, 15' with the aid of the turn-up portion 16a, 16a' thereof. In accordance with the invention, the number of bands of the metal cords w is made larger than the number of the metal cords w such that the bead core is made longer in cross section taken in the radial direction of the tire bead core. The bead core 11 located at the innermost side of the tire is provided, at its sector-shaped region included between a straight radial line $l$ drawn from a center of the bundles 12 and extending in parallel with the base 9 of the bead portion which is in contact with the rim 8 and a straight radial line $l'$ drawn from the center of the bundles 12 and inclined at an angle of 120 to 135° with respect to the straight radial line $l$, with a sector-shaped stress absorbing rubber layer R having a maximum thickness L of 0.7 to 6 times the outer diameter $d$ of the metal cord $w$ and a hardness which is at least equal to the lower hardness of the coating rubber of either one of the rubberized metal cord layer and the rubberized fabric 13. This sector-shaped rubber R constitutes a stress absorbing rubber layer which can alleviate the stress subjected to that region of the bead core 11 which is opposed to both the carcass 16 and the apex rubber 14.

As shown in FIG. 4, heretofore it has been the common practice to form bundles 12 of rubberized metal cord layers or a bead grommet by extruding a plurality of metal cords w arranged side by side and a coating rubber r into a tape-shaped composite band and then winding a plurality of these tape-shaped composite bands on a cylindrical form successively one upon the other.

In accordance with the invention, the bead grommet may be formed in substantially the same manner as the above conventional steps. But, the bead core 11 according to the invention is composed of a bead grommet which is provided at its one side surface with an additional rubber layer 17 and at its outer peripheral surface with an additional rubber layer 18 as shown in FIG. 5a or provided at two side surfaces thereof with additional rubber layers 17, 17' and at its outer peripheral surface with an additional layer 18 as shown in FIG. 5b.

Such additional rubber layers 17, 17' may be projected from one side or two sides of the extruded tape-shaped composite band assembly. The additional rubber layer 18 may be formed by the extruding rubber only into a tape-shaped layer and then bonding it on the outer peripheral surface of the bead grommet. The additional rubber layers 17, 17' may also be extruded in the same manner as in the case of the additional rubber layer 18 and bonded to one or two side surfaces of the bead grommet.

The thickness of these additional rubber layers is determined such that when a green tire is deformed into a toroidal shape, these additional rubber layers are deformed into the sector-shaped stress absorbing rubber layer R disposed between the two straight lines $l$, $l'$ and having a maximum thickness L at its center portion.

A tire to be tested having a size of 50 ×20–20 32PR was manufactured in the above described manner.

Each the inner and outer bead cores was composed of a bead grommet formed by extruding ten steel wires w arranged side by side and each having a diameter of 0.94 mm and a coating rubber having a Shore A hardness 78° into a tape-shaped composite band and then winding 17 of these tape-shaped composite bands on a cylindrical form successively one upon the other to obtain a bead grommet. The bead grommet thus obtained was covered with a wrapping tape formed of a nylon fabric.

The tire tested according to the invention shown in FIG. 5a compressed a bead grommet and additional rubber layers 17, 18 each composed of rubber having a hardness which is the same as the hardness of a coating rubber r. On the contrary, the prior art tire tested as shown in FIG. 4 compressed a bead grommet which is not provided with the additional rubber layer, but directly covered with a wrapping tape.

Each of the flippers 15 and the carcass plies 16 of the tire tested according to the invention were made of nylon, while each of the flippers 5 and the carcass plies 6 of the conventional tire tested were also made of nylon.

The test conditions were as follows. The tire was continuously rotated under proper conditions such that the carcass ply did not reach a temperature at which the carcass ply becomes dissolved. Then, the time until separation occurring around the bead core was measured. The durability against separation failure of the conventional tire in which the thickness of rubber corresponding to L is smaller than 0.3 times the diameter $d$ of the metal cord $w$ as shown in FIG. 1b extended to at most 1,000 minutes. On the contrary, the durability against separation failure of the tire according to the invention in which L is 1 to 2.5 times the diameter $d$ of the metal cord $w$ was improved to at least 4,800 minutes. Experimental tests have yielded good results which are substantially the same as the above mentioned results even when L is in a range of 0.7 to 6 times the diameter $d$ of the metal cord $w$.

As to the bead grommet formed by winding the tape-shaped composite bands, in the present state of tire production, the number of the tape-shaped composite bands is larger than the number of the rubberized metal cords arranged side by side in each tape-shaped composite band. However, the number of the rubberized metal cords arranged side by side in each tape-shaped composite band may eventually be made larger than the number of the tape-shaped composite bands. This is because of the fact that if the number of the tape-shaped composite bands is larger than the number of the rubberized metal cords arranged side by side, the bead grommet occupies that portion of the carcass which is moved a larger extent due to its relation with respect to the rim flange, and that, in order to obviate such a disadvantage, the number of the tape-shaped composite bands is reduced since the bead width could be made large. However, in a tire for airplanes used under heavy load and subjected to an extremely large flexure which is 25 to 40% of the sectional height of the tire, the bead width can not be made large. This is because, the use of the bead which is large in width and thickness results in a remarkably great accumulation of heat, so that the braking ability required for the tire for airplanes becomes degraded. Thus, it is obliged to use the bead grommet in which the number of the tape-shaped composite bands is large.

As a result, it is necessary to absorb the excessively large strain produced around the bead core caused by the movement of the carcass.

If the total periphery of the bead grommet is covered with the sector-shaped stress absorbing rubber layer, the bead core becomes unstable. As a result, the stress subjected to the surface of the bead core increases when the internal pressure is applied to the tire or the tire is deformed under loading. This causes the total width of the bead portion to be increased and hence heat accumulation becomes excessively large as the weight of the tire is increased.

As stated hereinbefore, the use of the sector-shaped stress absorbing rubber layer having a maximum thickness L which is equal to (0.7 to 6)$d$ and arranged in a sector-shaped region formed by two straight radial lines $l$ and $l'$ diverging from the center of the bead core, the straight line $l$ extending in parallel with the base of the bead portion and the straight line $l'$ extending toward the side wall and inclined at an angle of 120° to 135° with respect to the straight line $l$, ensures an effective absorption of the stress subjected to the surrounding of the bead core without increasing the weight of the bead portion and heat accumulation therein. The rubber used for the sector-shaped stress absorbing layer sandwiched between the bead grommet and the rubberized fabric functions to absorb the difference between the large rigidity of the bead grommet and the small rigidity of the rubberized fabric. The hardness of the rubber used for the stress absorbing rubber layer must be determined to a range intermediate between the hardness of the coating rubber of the metal cords and the hardness of the coating rubber of the fabric.

As stated hereinbefore, the invention is capable of efficiently alleviating the stress subjected to the bead core and inducing a vital failure such as wild wire or bead portion burst in a pneumatic tire used under heavy load and high flexural conditions and of improving the durability and safety of such kind of tire.

What is claimed is:

1. A reinforced bead portion for pneumatic tires comprising: a pair of bead core means, a bias carcass ply formed of a plurality of rubberized organic textile cord fabrics superimposed one upon the other and extending from one of said bead core means to the other, said pair of bead core means each composed of at least two bead cores, each one being inserted between and covered with said carcass ply and a turn-up portion thereof, each said bead core being formed by winding a plurality of rubberized metal cord layers one upon the other in radial direction with respect to the bead core, thereby forming a plurality of superimposed bands, the number of turns of said bands being at least equal to the number of metal cords of each rubberized metal cord layer, a rubberized fabric covering the total outer periphery of said band, and a sector-shaped stress absorbing rubber layer provided for at least the inside bead core and located in a sector-shaped region included between two straight radial lines diverging from the center of all of said bands of each bead core, one of said two straight radial lines extending from said center toward the inner side of the tire parallel with the base of the bead portion and inclined at an angle of 120° to 135° with respect to the other radial line, said sector-shaped stress absorbing rubber layer having a maximum thickness at its center which is 0.7 to 6 times the diameter of said metal cord and a hardness which is at least equal to the lowest hardness of the coating rubber of either one of said rubberized metal cord layer and said rubberized fabric 2. A reinforced bead portion for pneumatic tires as claimed in claim 1, wherein the maximum thickness of said stress absorbing rubber is 1 to 2.5 times the diameter of said metal cord.

3. A reinforced bead portion for pneumatic tires as claimed in claim 1, wherein the hardness of said stress absorbing rubber is in a range between the hardness of the coating rubber of said rubberized metal cords and the hardness of the coating rubber of said rubberized fabric.

* * * * *